July 2, 1929.  C. H. COLVIN ET AL  1,719,287
DRIFT AND SPEED METER
Filed April 18, 1922
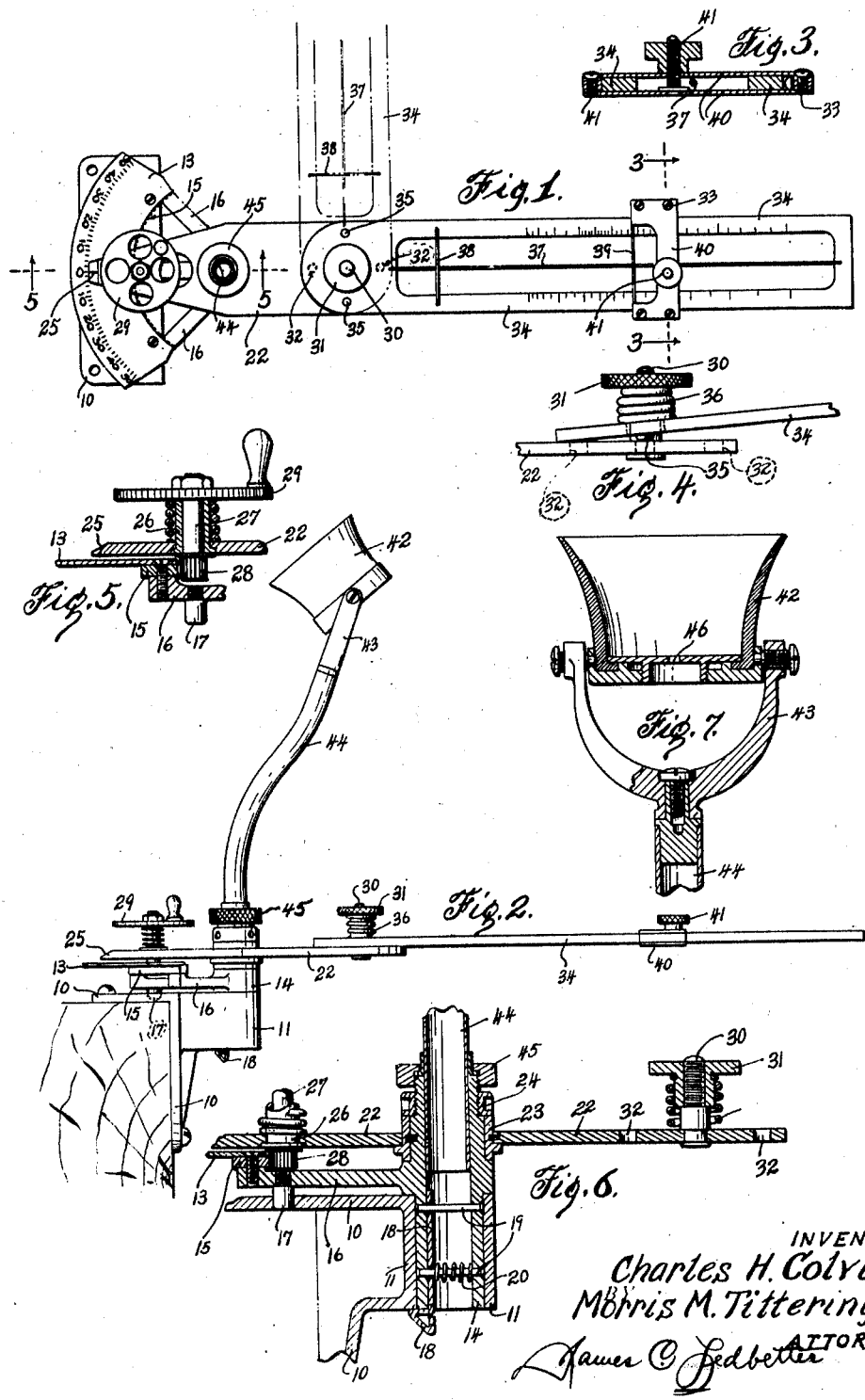
INVENTORS
Charles H. Colvin
Morris M. Titterington
ATTORNEY Patented July 2, 1929.

1,719,287

UNITED STATES PATENT OFFICE.

CHARLES H. COLVIN AND MORRIS M. TITTERINGTON, OF BROOKLYN, NEW YORK; GEORGE A. TITTERINGTON, EXECUTOR OF SAID MORRIS M. TITTERINGTON, DECEASED, ASSIGNORS TO PIONEER INSTRUMENT COMPANY, INCORPORATED, OF BROOKLYN, NEW YORK, A CORPORATION OF NEW YORK.

DRIFT AND SPEED METER.

Application filed April 18, 1922. Serial No. 554,992.

This invention relates to navigating instruments and more particularly to improvements in speed and drift meters.

An object of the invention is to produce an improved speed and drift meter useful in navigating aircraft, and more particularly useful in determining the angle of drift and the speed at which the craft is flying relatively to the ground. By drift is meant the angle between the direction in which the aircraft is headed and the course actually being traveled. This knowledge is essential to enable the aviator to select the desired course.

Additional objects of the invention are to improve certain details of construction so that a navigating instrument of this class may be economical to manufacture, simple to use under various conditions of service, and convenient to install or remove from the aircraft.

A speed and drift meter constructed in accordance with the plans of this invention embodies a mounting bracket or base plate which is permanently anchored to the craft. A quick detachable meter or indicating element, constructed in the form of a unit, is carried upon the base plate and is provided with actuating means for swinging the element around until it is in position where observations can be made for the purpose of determining the drift and speed of the craft; and the meter element embodies a compound speed and drift arm with an index pointer which directly points out the craft's drift angle in degrees together with a graduated meter arm or vane from which the speed of the craft is reckoned. The instrument is provided with an adjustable eye piece through which observations are made as will be hereinafter described.

The accompanying drawings illustrate one practical embodiment of the invention, and although there is shown a preferred form of construction and mode of operation, we claim a right of protection as to any such changes as may obviously come within the scope of the invention.

Figure 1 shows a plan view of the instrument with the eye-piece removed, and in this view the indicating vane or arm is shown in dotted lines as swung around right angular to the arm support.

Figure 2 shows a side view of the instrument as secured to the framework of a craft with the eye-piece in position.

Figure 3 is a sectional view taken on the line 3—3 of Figure 1, and illustrates an improved slide carrying a movable cross wire or distance wire.

Figure 4 is a fragmentary view illustrating a swinging joint connection between the two members composing the meter vane.

Figure 5 is a sectional view taken on the line 5—5 of Fig. 1 to illustrate a hand driving means used to swing the meter vane and drift wire into service or observing position.

Figure 6 is a sectional view taken through the base or mounting plate to illustrate the quick detachable means employed to secure the meter element to the aircraft.

Figure 7 shows the eye-piece in section to illustrate its universal mounting.

Referring now more particularly to the drawings for a detailed description of the invention, there is shown a base or mounting plate comprising flanges 10 designed to be screw fastened to the frame of the craft; and the flanges carry a socket support 11 which detachably receives and rigidly holds the meter instrument in position. The base plate or mounting bracket 10—11 may be fastened on the craft so as to dispose the meter instrument over the side thereof with the drift vane held a suitable distance from the craft so as to insure an unobstructed observation.

A tubular support or post 14 is disposed in the socket 11 and carries a spider or frame 16 upon which is mounted a gear sector 15 concentric with the axis of the tubular support 14. A graduated dial means or plate 13 is either made integral with or screw-fastened to the gear sector 15, the dial plate being graduated with a suitably marked drift scale, as observed in Figure 1, and the scale preferably consisting of a zero mark in the center with numerical graduations running from the zero mark outwardly to either end of the dial plate. A locating pin or lug 17 is anchored to the under side of the gear sector 15—16 and rests in a hole made in the base plate 10. A catch 18 is loosely confined on pins 19 within the tubular support post 14, and a compression spring 20 is confined on one of the pins 19 to hold the catch 18 in engagement with the socket 11 to lock the support post 14 into the base plate 10, as shown in Figure 6. The catch 18, together with the locating lug 17 serves to hold the support post, including all the meter parts carried on the post, in fixed relation to the base plate; and in removing the drift and speed meter from the craft, it is only necessary to press back the catch 18 and lift the meter out of the socket 11.

A plate or vane support 22 has a bearing hub 23 and is journaled upon the upper end of the support post 14 with a nut 24 screwed on to the post to hold the arm or vane support 22 in position. The rear end of the support arm or vane is tapered down to form an index pointer 25 which swings around the graduated drift scale on the face of the aforesaid dial plate 13. A bearing hub 26 is anchored to the vane support and the shaft 27 is rotatably confined therein with a pinion 28 fixed on the lower end of the shaft 27 and meshed with the teeth of gear sector 15. A hand wheel 29 is fixed on the upper end of the shaft 27 by which the pinion 28 is driven around the gear sector 15 to swing the vane support 22 about the axis of the support post 14. A threaded stud or screw 30 is anchored on the outer end of the vane support, and this stud is fitted with a knurled thumb nut 31. Holes 32 are made in the vane support 22 concentric with the threaded stud 30, and the holes are preferably disposed diametrically opposite each other in respect to the pivot 30.

A meter vane or arm 34 is carried upon this support 22 through the agency of the stud 30 and holes 32. One end of this meter vane is provided with a pair of pins or lugs 35 which register with the holes 32 in the vane support. A coil compression spring 36 is confined on the threaded stud 30 under the nut to hold the lugs 35 in registry with the holes 32, whereby the parts 22 and 34 are held in fixed relation and adapted to function as a rigid one-piece member. The spring 36 yields sufficiently to admit of lifting the outer end of the meter vane 34 so as to disengage the lugs 35 from the holes or sockets 32 whereby the meter vane may be swung about the axis of the screw 30 in case it is desirable to bring it around to an observing position, as shown in dotted lines in Figure 1, right angular to the straight line position shown in the drawings. While the support 22 and meter vane 34 are disclosed as made in separate parts and adjustably connected by the flexible joint means 30, it is to be understood that one continuous integral meter vane may be used if desired. The thumb nut 31, with the spring 36, may be removed from the stud 30, permitting the removal of the vane 34 from its support 22, to permit the instrument to be packed in a small space when not in use.

The meter vane 34 is made with an elongated open space in which is anchored a drift wire or sight wire 37; and a zero wire or cross wire 38 is secured across the open space and across the drift wire near the rear end of the meter vane to provide a reference mark which serves as a starting or finishing point in making speed observations. The meter arm is graduated on the upper face thereof with suitable indicia, as shown in Figure 1; and reference numerals may be imprinted thereon.

A movable cross wire or distance wire 39 is carried on a slide 40 and is moved along the meter vane by the hand of the observer. The slide 40 comprises a pair of spaced parallel plates held in position by screws 33 or other suitable means; and a thumb nut and screw 41 is carried by the plates 40 to regulate the friction which exists between the slide and meter vane when the distance wire 30 is moved along the drift wire 37.

An eye-piece 42 is pivotally mounted in a yoke 43, and the yoke is pivotally carried on the upper end of a support arm or post 44. The lower end of the arm or post 44 is designed to swivel in the upper end of the support post 14; and a knurled nut 45 is screw threaded onto the upper end of the support post 14 to impose friction on the stem to hold it in immovable adjusted position. The eye-piece 42 is provided with a small orifice or peep hole 46 through which the observer sights along the drift wire 37 towards the earth when using the instrument. By loosening the nut 45 the post or arm 44 may be swiveled in the mounting bracket to adjust the eye piece to any desired position over the distance and drift wire carried by the vane.

An important feature of this invention is the two-part indicating arm composed of a meter vane adjustably carried upon the support 22 including a pointer 25 which travels across the graduated dial plate; and the manner of attaching meter vane or arm 34 to the pointer or vane holder 22 renders it possible to swing the vane around the pivot 30 thereby altering the relation of said vane to the pointer 25. This arrangement makes it possible for an observer, in case he has failed for any reason to secure effective observation from the front or forward direction of travel, to quickly lift up on the outer tip of the vane and swing it around 180 degrees until it points rearwardly thereby enabling him to repeat his observation by watching the same object as it passes under the craft to the rear; and in sea going aircraft this is a distinct advantage because objects, such as water craft, may be far between and the observer must necessarily be well prepared to take as full and complete observation as possible from one object. Again the facility with which the instrument is attached to and detached from the base plate renders it possible for the craft to be fitted with several base plates placed at various points of advantage so that observations may be made from different locations on the craft.

In describing the use of the instrument, it is assumed that it is so installed and adjusted on the craft and observations are so carried out in flight that the zero wire 38 first approaches objects on the ground and thereafter the said objects appear to travel along the drift wire 37 towards the distance wire 39. The observer rotates the hand wheel 29 until the meter vane and drift wire 37 are lined up parallel to the apparent motion of the objects on the ground or sea. The pilot or the one taking the observation peeps or observes through the eye-piece 42 for the purpose of watching the ground objects. After the drift wire 37 is adjusted parallel to the apparent motion of ground bodies the drift of the craft is read directly from the drift dial plate 13. For example, if the pointer 25 is found to coincide with the mark 20 on the dial plate, the pilot perceives that his craft is drifting at an angle of 20 degrees from the direction in which it is heading, and the heading may if necessary be altered to cause the craft to follow any desired course.

In the use of this navigating instrument to determine speed relative to the ground, the scale markings on the meter vane 34 are used in conjunction with the zero wire 38, the distance wire 39 and the eye-piece 42. The observer sets the slide 40 upon a particular scale marking which corresponds to the altitude at which the craft is travelling. The observer next, after having aligned the drift wire 37 with the apparent motion of ground objects, catches sight of some ground object at the instant the zero wire 38 passes said object and simultaneously the time of crossing the object is taken, as for example by the use of a stop watch. As the craft flies onward the object appears to travel along the drift wire 37 approaching the distance wire 39 and when the object crosses under the distance wire 39 the time is again observed, which enables one to calculate the elapsed time. It is to be observed that the actual ground distance travelled by the air craft during the measured elapsed time is the distance measured on the ground by the angle subtended by a line drawn from the eye-piece through the zero wire to the ground and another line drawn from the eye-piece through the distance wire 39 to the ground. If, for example, the scale on the vane is laid out so that this ground distance is one mile, and the noted elapsed time was, say, 50 seconds, the speed is easily calculated to be 72 miles per hour. A chart or graph may be used to convert observed time into speed, avoiding the necessity of making calculations.

Thus it is seen how the instrument is used for determining the drift angle and permitting the pilot to select the proper heading to cause his craft to follow the desired course, and likewise how the instrument is used to determine the actual speed of the craft in relation to the ground.

We claim:

1. In navigating instruments and the like, a base plate mounting bracket having a socket receptacle, a support post removably held in the socket receptacle, a graduated meter vane pivoted on the post; a drift wire, a zero wire, and a distance wire carried by said meter vane, said zero and distance wires crossing the drift wire; a pinion journaled in the vane, a stationary gear sector carried by the base plate engaging the pinion, and means for driving the pinion along the stationary gear sector to swing the meter vane.

2. In navigating instruments and the like, a mounting bracket adapted to be permanently installed on the craft, said bracket having a socket receptacle, a stationary gear sector removably mounted in the socket receptacle, a meter vane pivotally carried on the gear sector and being provided with an indicating scale, and driving means carried on the vane engaging the gear sector to swing the meter vane.

3. In navigating instruments and the like, a mounting bracket having a socket receptacle, a tubular post disposed in the receptacle, a spring pressed catch carried in one end of the tubular post to fasten the instrument on the mounting bracket, a stem carried in the other end of the tubular post, an eye-piece carried on the upper end of the stem, a gear sector fixed on the post, a meter vane provided with indicating means pivoted on the post and swingable in relation to the gear sector, and means cooperating with the gear sector to swing the vane.

4. In navigating instruments and the like, a mounting bracket adapted to be secured to a craft and having a socket, a support post disposed in the socket of the mounting bracket, a gear carried with the support post, a locating lug and lug receiving means associated with the gear and mounting bracket by which the parts are quickly attached and held in rigid relation, a quick detachable fastening means to hold the lug and lug receiving means and support post in service position on the mounting bracket, and an indicating meter vane carried on the support post.

5. In navigating instruments and the like, a tubular post, attaching means on one end of the post by which the instrument is anchored to a craft, an eye-piece, means mounting said eye-piece on the other end of the post, an elongated meter vane with a scale swingably carried on the post, said meter vane formed with an internal elongated open space opening therethrough, a sight and drift wire spanning the open space of the meter vane and anchored therein, a zero wire index spanning the open space transversely to the sight and drift wire and fixed on the meter vane, a slide mounted on the meter vane, and a distance wire carried by the slide transversely to the sight and drift wire and movable on the meter vane along the scale.

6. In drift and speed meters for navigation purposes, a post adapted to be fastened to a craft to hold the meter in service position, a spider made on the post, a gear sector carried on the spider, a graduated dial plate secured to the gear sector, a swingable indicating vane pivotally mounted on the post, a pointer made on one end of the vane and movable along the graduated dial, and a manually operable gear drive carried by the indicating vane engaging the gear sector to swing said vane and pointer.

7. In drift and speed meters, a post to hold the meter in service position, a stationary graduated drift dial held in spaced concentric relation from the post, a support pivoted on the post, one end of the said support being tapered to form an indicating pointer movable along the graduated drift dial, a hand actuated means for swinging the support, an indicating vane carried on the other end of the support, and means attaching the indicating vane and support whereby these two parts are angularly movable one in relation to the other.

8. In drift and speed meters, a mounting bracket, a post by which the meter is installed in service position on the bracket, a gear sector carried by and fixed to the post, a support pivoted on the post, a hand-wheel journaled in the support adjacent the gear sector, a pinion connected with the hand-wheel and meshing with the gear sector, a pointer formed on the end of the support, a dial on the gear sector adjacent the pointer, an indicating vane attached to the other end of the support, and an eye-piece carried by the meter through which observations may be made along the indicating vane.

9. In speed and drift meters, a mounting bracket, a post, means by which the post is detachably held in the bracket, a support pivotally carried on the post, a pointer made on one end of the support, a dial cooperating with the pointer, a hand driven means carried on the support and pointer for swinging the support, an indicating vane, a spring pressed means adapted to adjustably fix the indicating vane upon the support, and a lug and socket means disposed between the support and indicating vane to rigidly join together the two members.

10. In speed and drift meters; a two-part indicating arm comprising a pointer, and a meter vane swingingly attached to the pointer; dial means cooperating with the pointer, adjustable locking means carried by the two-part arm whereby one part is rigidly secured on the other but adjustable in relation thereto, and an observation eye-piece carried by the meter through which objects may be observed and sighted along the meter vane.

11. In speed and drift meters, dial means for indicating the drift of a craft, a compound speed and drift arm cooperating with the dial, a pointer on the arm designating drift on the dial means, a drift wire on the arm, said arm being provided with a scale, means whereby the drift wire and arm are adjustably movable relatively to the pointer, and an eye-piece provided on the meter through which an observation is made.

12. In speed and drift meters, dial means for indicating drift, a compound speed and drift arm, means for moving the arm, a drift pointer carried with said arm and movable along the dial, a drift and sight wire carried by the arm, said arm provided with a speed scale, a zero index wire and a movable distance wire carried on the arm for use in connection with the scale, and means for adjusting said drift pointer in predetermined angular relation to the arm.

13. In navigation instruments, a mounting plate provided with a socket, a post held in the socket, a drift dial fixed on the post, a swingable meter vane provided with a dial pointer and speed graduations and including a sight wire pivoted on the post, an eye-piece for viewing the sight wire mounted on the post above the meter vane, locking means for holding the eye-piece in adjusted position, and locking means engaging the post and mounting plate to render the instrument quickly detachable from the mounting plate.

14. In navigating instruments and the like, a mounting bracket, a gear sector and a drift scale mounted thereon, a meter vane pivotally carried on the base bracket, a pointer on the meter vane movable along the drift scale, a gear rotatably carried with the vane and meshing with the sector, means to rotate the gear to vary the angularity of the vane with respect to the scale, a drift and sight wire carried by the meter vane, and an eye-piece carried by the instrument through which observations over said wire may be made.

In testimony whereof we affix our signatures this 17th day of April 1922, in the State of New York, city of New York, and county of Kings.

CHARLES H. COLVIN.
MORRIS M. TITTERINGTON.